United States Patent
Terada et al.

(10) Patent No.: US 9,373,852 B2
(45) Date of Patent: Jun. 21, 2016

(54) FUEL CELL STACK

(71) Applicant: HONDA MOTOR CO., LTD., Tokyo (JP)

(72) Inventors: Eri Terada, Wako (JP); Kentaro Ishida, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 157 days.

(21) Appl. No.: 14/183,522

(22) Filed: Feb. 19, 2014

(65) Prior Publication Data

US 2014/0234746 A1    Aug. 21, 2014

(30) Foreign Application Priority Data

Feb. 20, 2013 (JP) ................................ 2013-031410

(51) Int. Cl.
*H01M 8/02* (2016.01)
*H01M 8/24* (2016.01)

(52) U.S. Cl.
CPC .......... *H01M 8/0247* (2013.01); *H01M 8/0276* (2013.01); *H01M 8/0297* (2013.01); *H01M 8/242* (2013.01); *H01M 8/0206* (2013.01); *H01M 8/0258* (2013.01); *H01M 8/0273* (2013.01); *H01M 8/2465* (2013.01); *H01M 8/2485* (2013.01); *Y02E 60/50* (2013.01)

(58) Field of Classification Search
CPC ............ H01M 8/0273; H01M 8/0276; H01M 8/2465; H01M 8/2485
See application file for complete search history.

(56) References Cited

U.S. PATENT DOCUMENTS

| | | | |
|---|---|---|---|
| 7,767,355 B2 | 8/2010 | Kato et al. | |
| 7,799,480 B2 | 9/2010 | Nishiyama et al. | |
| 8,574,778 B2 | 11/2013 | Jinba et al. | |
| 2006/0110650 A1* | 5/2006 | Sugiura et al. | 429/38 |
| 2010/0068599 A1 | 3/2010 | Furusawa et al. | |
| 2012/0295177 A1* | 11/2012 | Ishida et al. | 429/434 |

FOREIGN PATENT DOCUMENTS

JP    4727972 B2    6/2006

* cited by examiner

*Primary Examiner* — Jeremiah Smith
(74) *Attorney, Agent, or Firm* — Mori & Ward, LLP

(57) ABSTRACT

A fuel cell stack includes a stacked body, a first terminal plate, a first insulator, a first end plate, a second terminal plate, a second insulator, a second end plate, a fluid manifold, a fluid channel, a fluid hole, a first connection passage, and a second connection passage. The stacked body includes a plurality of separators and a membrane electrode assembly. The plurality of separators and the membrane electrode assembly are stacked in a stacking direction. The membrane electrode assembly includes an electrolyte membrane and a pair of electrodes sandwiching the electrolyte membrane therebetween. The stacked body has a first end and a second end opposite to the first end in the stacking direction. The first terminal plate, the first insulator, and the first end plate are disposed at the first end of the stacked body.

15 Claims, 15 Drawing Sheets

FUEL CELL STACK

CROSS-REFERENCE TO RELATED APPLICATIONS

The present application claims priority under 35 U.S.C. §119 to Japanese Patent Application No. 2013-031410, filed Feb. 20, 2013, entitled "Fuel Cell Stack." The contents of this application are incorporated herein by reference in their entirety.

BACKGROUND

1. Field

The present disclosure relates to a fuel cell stack.

2. Description of the Related Art

For example, a solid polymer electrolyte fuel cell includes a membrane electrode assembly (MEA) and a pair of separators sandwiching the MEA therebetween. The MBA includes an electrolyte membrane, which is made from a solid polymer ion-exchange membrane, an anode electrode disposed on one side of the electrolyte membrane, and a cathode electrode disposed on the other side of the electrolyte membrane. Usually, fuel cells are stacked so as to form a fuel cell stack. For example, the fuel cell stack is mounted on a fuel-cell electric vehicle and used as an automobile fuel cell system.

A fuel cell stack includes a stacked body in which a plurality of fuel cells are stacked; and a terminal plate, an insulator, and an end plate that are stacked at each end of the stacked body in the stacking direction. For example, Japanese Patent No. 4727972 describes a fuel cell stack in which a dummy cell is disposed on at least one end portion of a stacked body in the stacking direction. The dummy cell is disposed between the stacked body and a terminal plate so as to correspond to a fuel cell. The dummy cell includes a metal plate instead of an electrolyte membrane and does not generate water because the dummy cell does not generate electric power. Therefore, the dummy cell functions as a heat insulating layer.

SUMMARY

According to one aspect of the present invention, a fuel cell stack includes a stacked body, a first terminal plate, a first insulator, a first end plate, a second terminal plate, a second insulator, a second end plate, a fluid manifold, a fluid channel, a fluid hole, a first connection passage, and a second connection passage. The stacked body includes a plurality of separators and a membrane electrode assembly. The plurality of separators and the membrane electrode assembly are stacked in a stacking direction. The membrane electrode assembly includes an electrolyte membrane and a pair of electrodes sandwiching the electrolyte membrane therebetween. The stacked body has a first end and a second end opposite to the first end in the stacking direction. The first terminal plate, the first insulator, and the first end plate are disposed at the first end of the stacked body. The second terminal plate, the second insulator, and the second end plate are disposed at the second end of the stacked body. Each of the first and second terminal plates is provided in a first recessed portion formed in each of the first and second insulators. Each of the first and second insulators has a channel formed in an outer peripheral part of each of the first and second insulators. A fluid is to flow through the fluid manifold in the stacking direction. The fluid includes a fuel gas, an oxidant gas, a coolant, or a combination thereof. The fluid is to flow through the fluid channel along a surface of the plurality of separators. The fluid hole is provided in at least one separator among the plurality of separators to extend through the at least one separator in the stacking direction. The outer peripheral part of each of the first and second insulators is in contact with the at least one separator. The first connection passage connects the fluid manifold and the fluid hole on a first side of the at least one separator. The second connection passage connects the fluid hole and the fluid channel on a second side opposite to the first side of the at least one separator. The channel of each of the first and second insulators forms a part of each of the first and second connection passages and connects the fluid manifold and the fluid hole.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
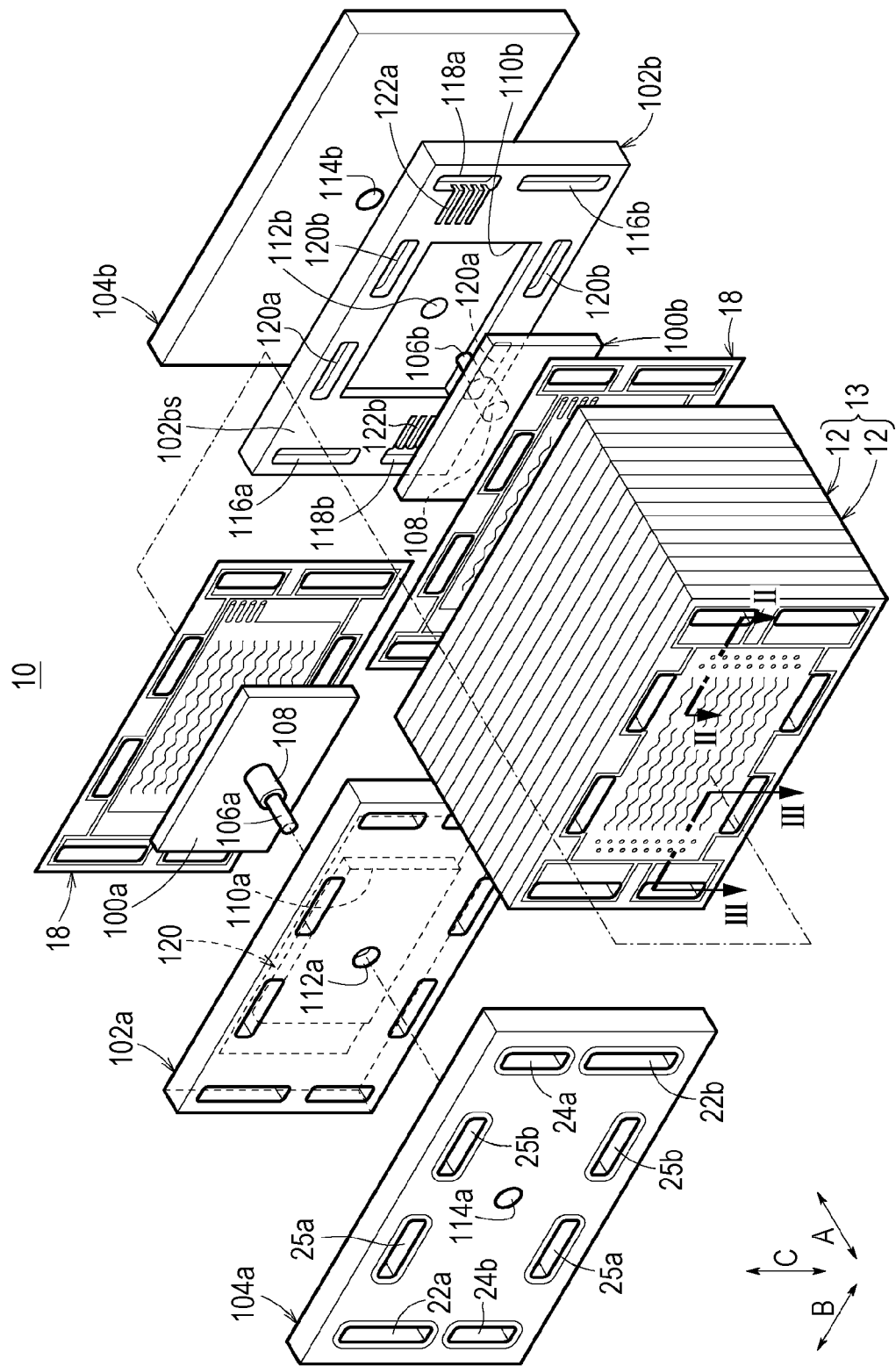
FIG. 1 is a partially exploded schematic perspective view of a fuel cell stack according to a first embodiment of the present disclosure.

The embodiments will now be described with reference to the accompanying drawings, wherein like reference numerals designate corresponding or identical elements throughout the various drawings.

Figure 2:
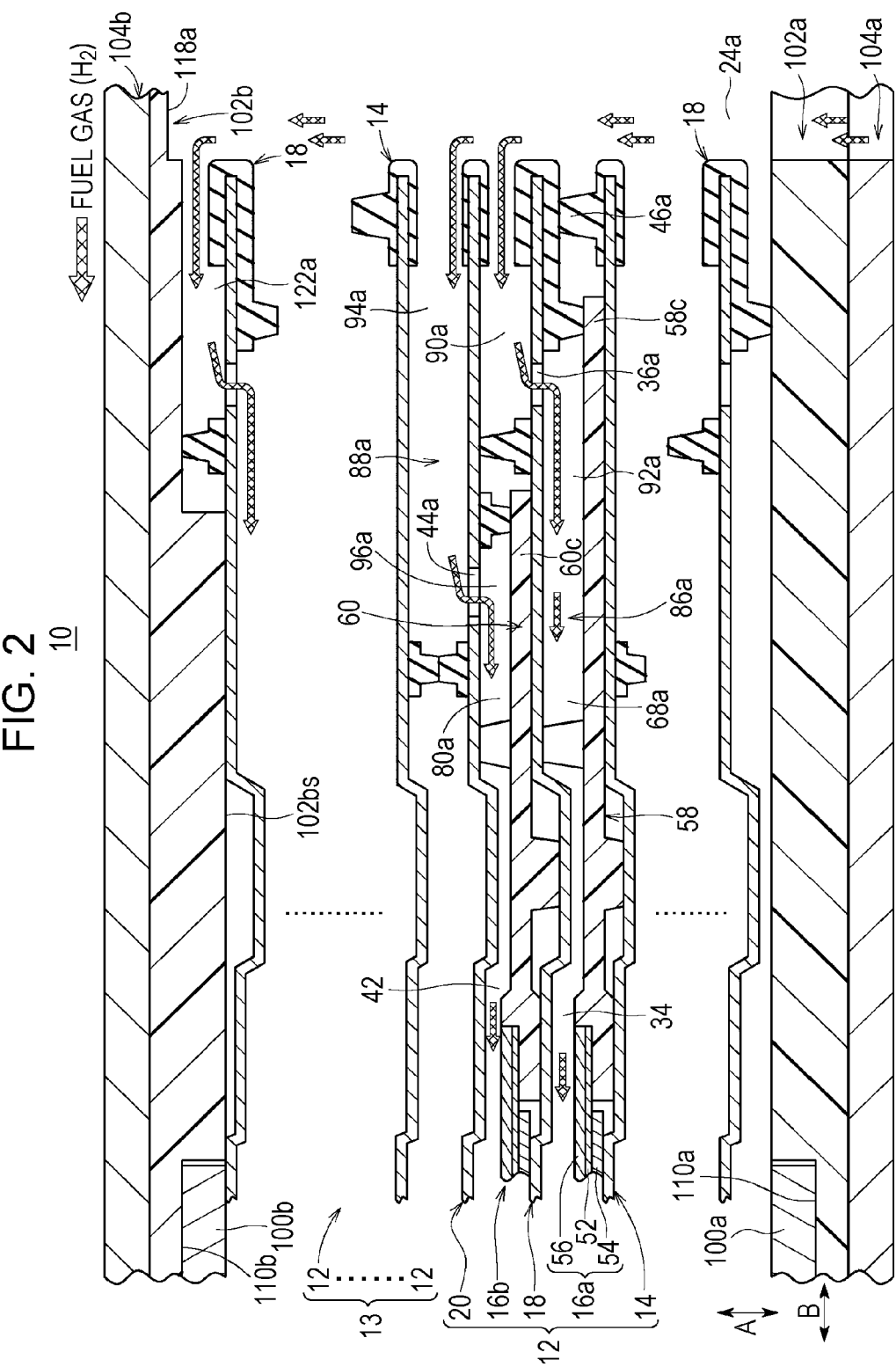
FIG. 2 is a sectional view of the fuel cell stack taken along line II-II of FIG. 1.

As illustrated in FIGS. 1 and 2, a fuel cell stack 10 according to a first embodiment of the present disclosure includes a stacked body 13 in which a plurality of power generation units 12 in upright positions are stacked in a horizontal direction (direction of arrow A).

As illustrated in FIG. 1, at one end of the stacked body 13 in the stacking direction (direction of arrow A), a terminal plate 100a, an insulator (insulation plate) 102a, and an end plate 104a are stacked outward in this order. At the other end of the stacked body 13 in the stacking direction, a terminal plate 100b, an insulator (insulation plate) 102b, and an end plate 104b are stacked outward in this order.

For example, the fuel cell stack 10 is integrally held in a box casing (not shown) having the end plates 104a and 104b, which are rectangular, as its end located plates. Alternatively, the fuel cell stack 10 is integrally fastened by using a plurality of tie rods (not shown) extending in the direction of arrow A.

As illustrated in FIGS. 2 to 5, each of the power generation units 12 includes a first metal separator 14, a first membrane electrode assembly 16a, a second metal separator 18, a second membrane electrode assembly 16b, and a third metal separator 20. The first metal separator 14, the first membrane electrode assembly 16a, the second metal separator 18, the second membrane electrode assembly 16b, and the third metal separator 20 are stacked in a horizontal direction. Electrode surfaces of the first and second membrane electrode assemblies 16a and 16b extend vertically and have horizontally-elongated shapes (see FIG. 4).

The first metal separator 14, the second metal separator 18, and the third metal separator 20 are each made from a horizontally-elongated metal plate, such as a steel plate, a stainless steel plate, an aluminum plate, a galvanized steel plate, or any of such thin metal plates having an anti-corrosive coating on the surface thereof. The first metal separator 14, the second metal separator 18, and the third metal separator 20, which have rectangular shapes in plan view, are formed by press-forming thin metal plates so as to have corrugated cross-sectional shapes. Instead of the metal separators, carbon separators may be used.

Figure 4:
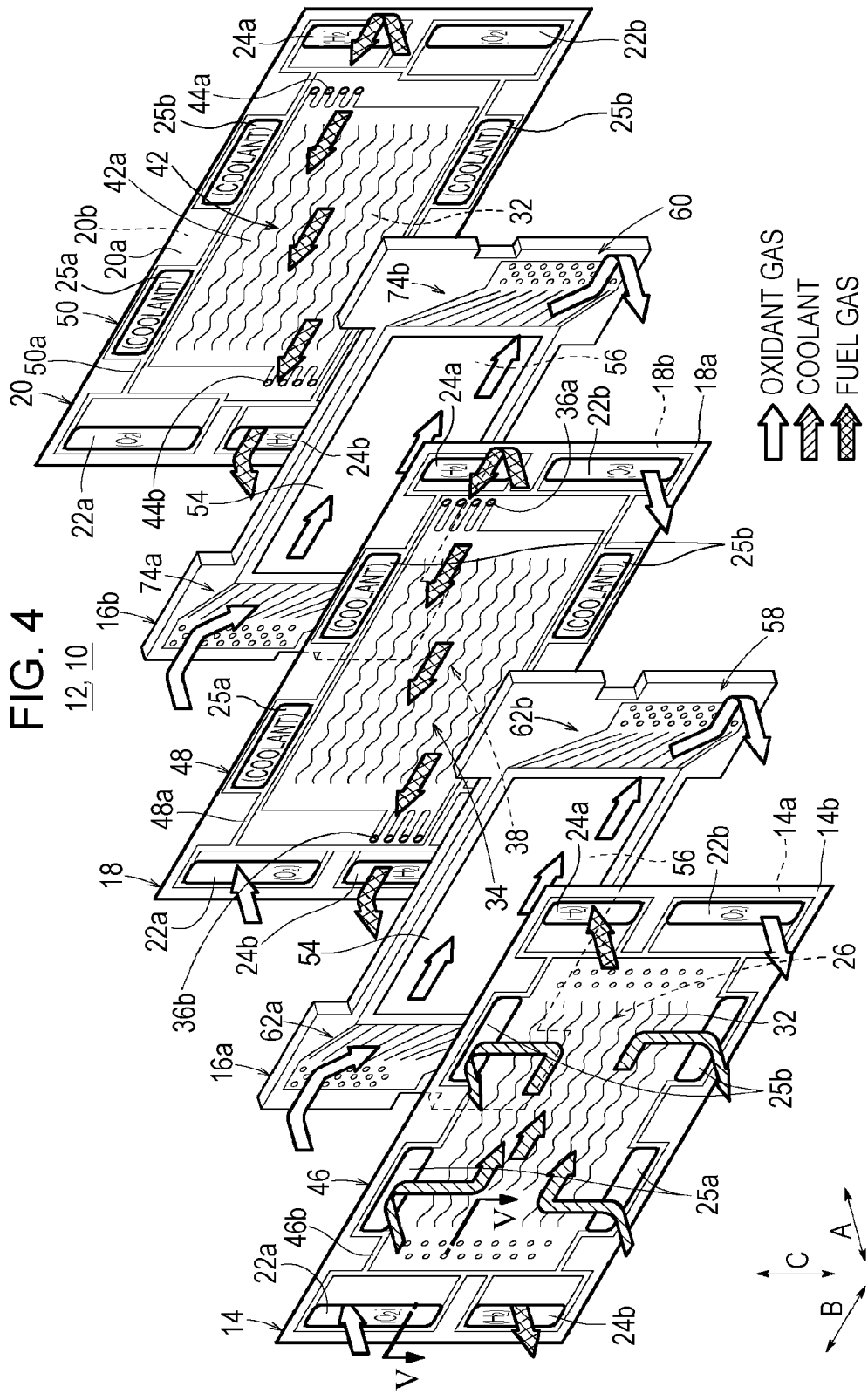
FIG. 4 is a partial exploded perspective view of a power generation unit of the fuel cell stack.

As illustrated in FIG. 4, an oxidant gas inlet manifold 22a and a fuel gas outlet manifold 24b are formed in the power generation unit 12 so as to extend in the direction of arrow A at one end portion of the power generation unit 12 in the longitudinal direction (direction of arrow B), that is, one end portion of each of the first metal separator 14, the second metal separator 18, and the third metal separator 20 in the longitudinal direction. An oxidant gas (fluid), such as an oxygen-containing gas, is supplied through the oxidant gas inlet manifold 22a. A fuel gas (fluid), such as a hydrogen-containing gas, is discharged through the fuel gas outlet manifold 24b.

A fuel gas inlet manifold 24a and an oxidant gas outlet manifold 22b are formed in the power generation unit 12 so as to extend in the direction of arrow A at the other end portion of the power generation unit 12 in the longitudinal direction (direction of arrow B). The fuel gas is supplied through the fuel gas inlet manifold 24a. The oxidant gas is discharged through the oxidant gas outlet manifold 22b.

A pair of coolant inlet manifolds 25a are formed in the power generation unit 12 so as to extend in the direction of arrow A through end portions of the power generation unit 12 in the transversal direction (direction of arrow C) near the oxidant gas inlet manifold 22a. A coolant (fluid) is supplied through the pair of coolant inlet manifolds 25a. A pair of coolant outlet manifolds 25b are formed in the power generation unit 12 so as to extend in the direction of arrow A through end portions of the power generation unit 12 in the transversal direction near the fuel gas inlet manifold 24a. The coolant is discharged through the pair of coolant outlet manifolds 25b.

Figure 6:
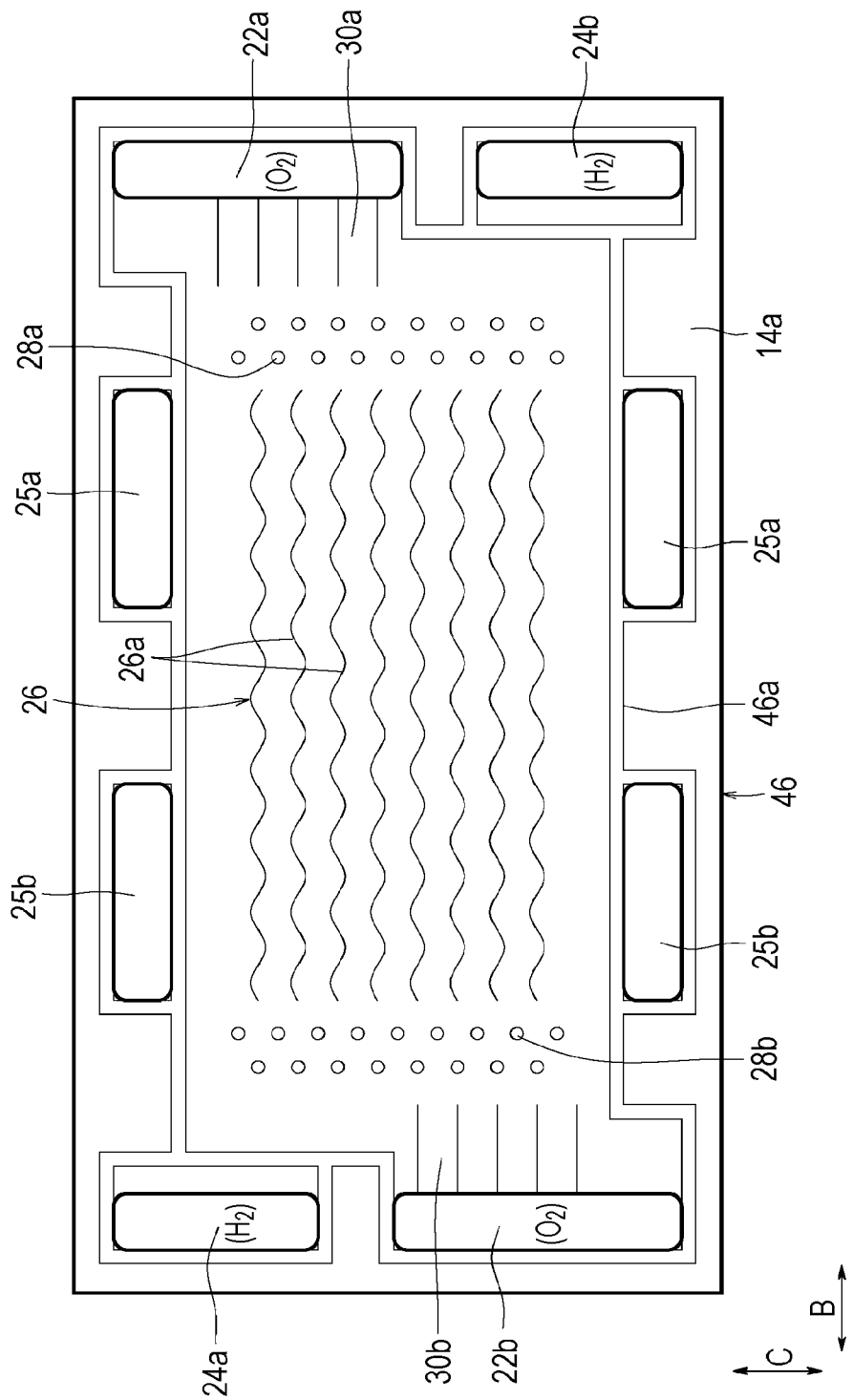
FIG. 6 is a plan view of a first metal separator of the power generation unit.

As illustrated in FIG. 6, a first oxidant gas channel (fluid channel) 26, through which the oxidant gas inlet manifold 22a is connected to the oxidant gas outlet manifold 22b, is formed on a surface 14a of the first metal separator 14 facing the first membrane electrode assembly 16a.

The first oxidant gas channel 26 includes a plurality of wave-shaped channel grooves (or linear channel grooves) 26a extending in the direction of arrow B. An inlet embossed portion 28a and an outlet embossed portion 28b, each having a plurality of protrusions, are respectively disposed near an inlet and outlet of the first oxidant gas channel 26.

A plurality of inlet connection grooves 30a, which constitute a bridge portion, are formed between the inlet embossed portion 28a and the oxidant gas inlet manifold 22a. A plurality of outlet connection grooves 30b, which constitute a bridge portion, are formed between the outlet embossed portion 28b and the oxidant gas outlet manifold 22b.

As illustrated in FIG. 4, a coolant channel (fluid channel) 32, through which the pair of coolant inlet manifolds 25a are connected to the pair of coolant outlet manifolds 25b, is formed on a surface 14b of the first metal separator 14. The coolant channel 32 is formed between the back side of the first oxidant gas channel 26 and the back side of a second fuel gas channel 42 (described below).

Figure 7:
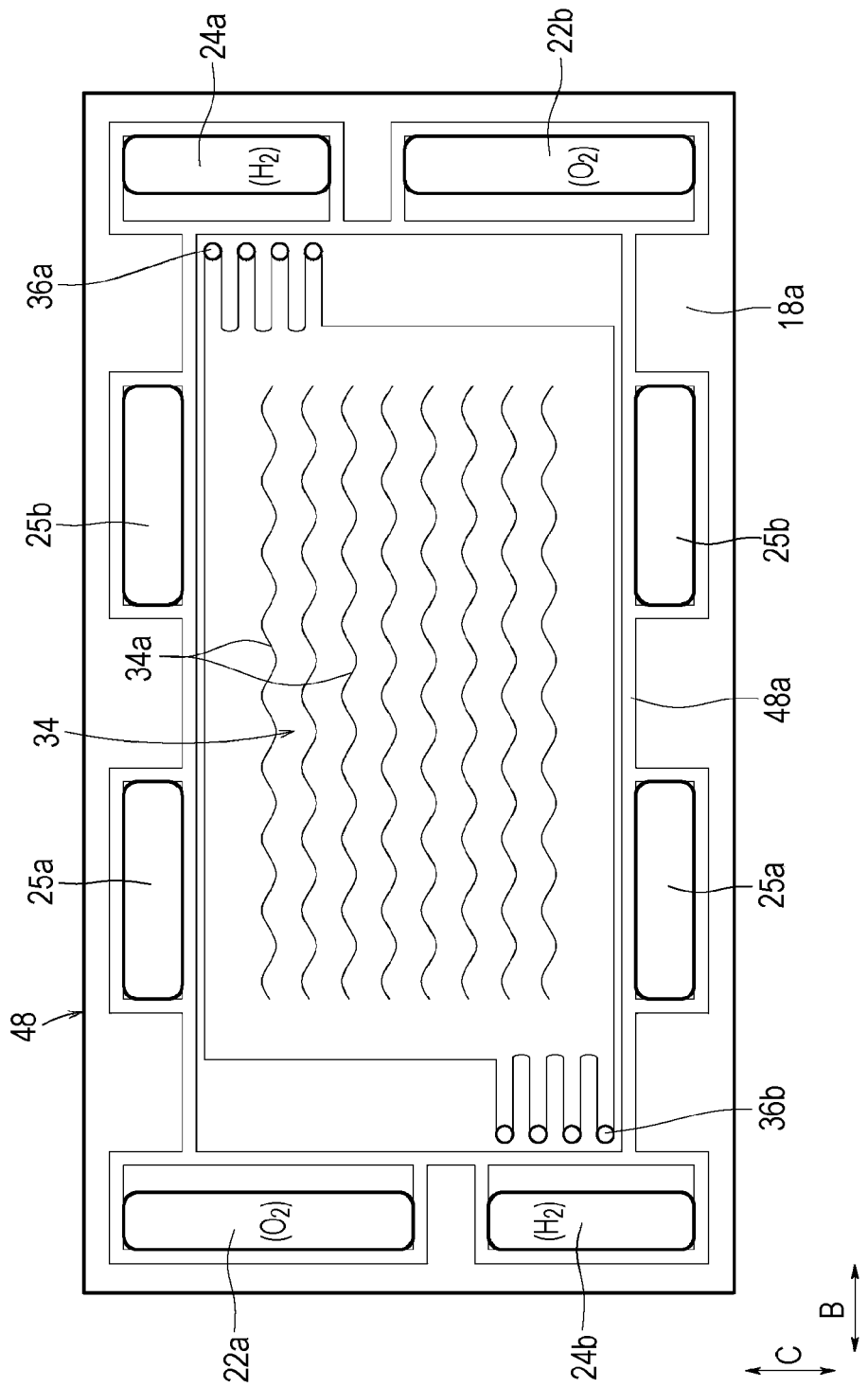
FIG. 7 is a plan view showing one surface of a second metal separator of the power generation unit.

As illustrated in FIG. 7, a first fuel gas channel (fluid channel) 34, through which the fuel gas inlet manifold 24a is connected to the fuel gas outlet manifold 24b, is formed on a surface 18a of the second metal separator 18 facing the first membrane electrode assembly 16a. The first fuel gas channel 34 includes a plurality of wave-shaped channel grooves (or linear channel grooves) 34a extending in the direction of arrow B. A plurality of supply holes (fluid holes) 36a are formed near the fuel gas inlet manifold 24a. A plurality of discharge holes (fluid holes) 36b are formed near the fuel gas outlet manifold 24b.

Figure 8:
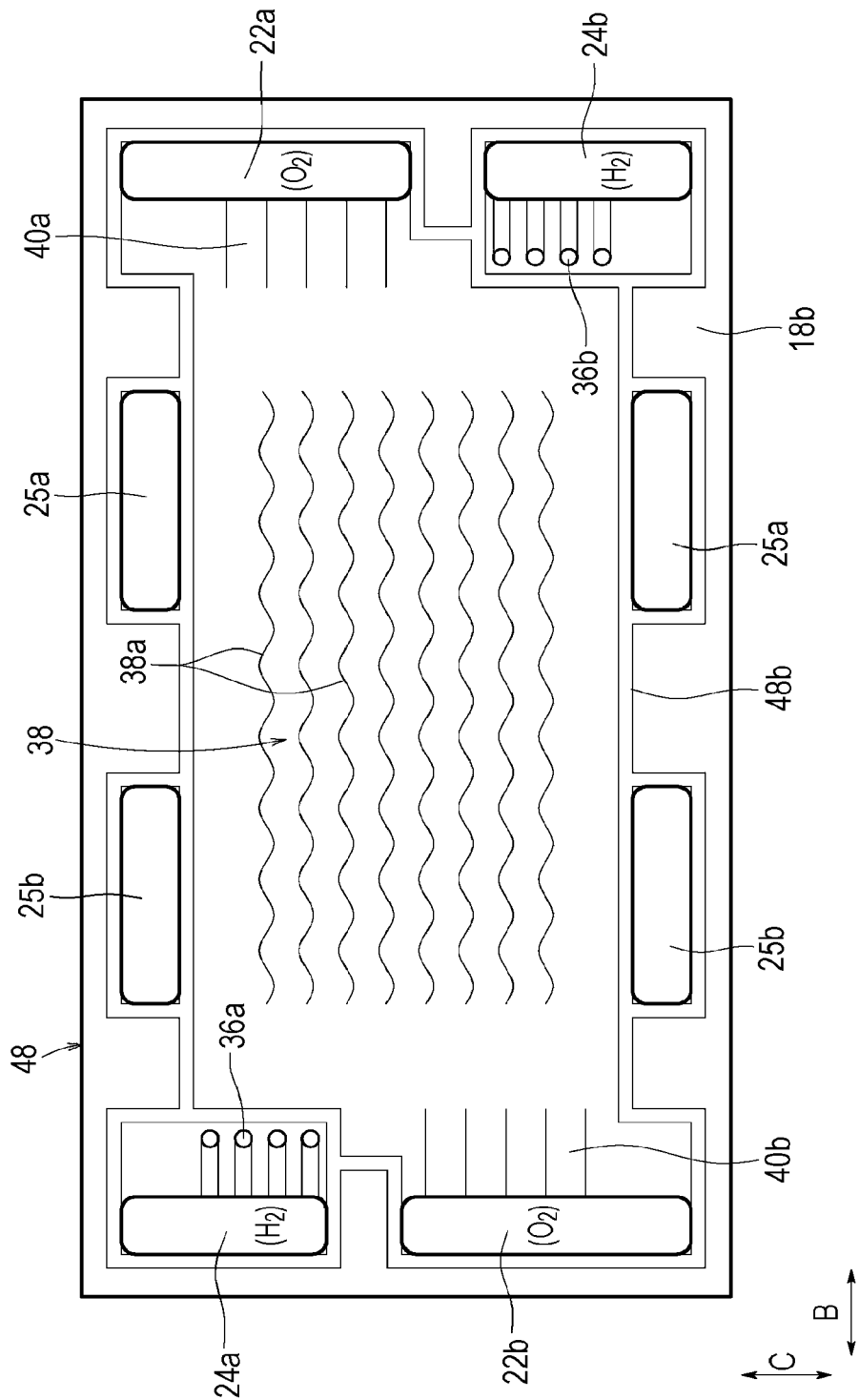
FIG. 8 is a plan view showing the other surface of the second metal separator.

As illustrated in FIG. 8, a second oxidant gas channel (fluid channel) 38, through which the oxidant gas inlet manifold 22a is connected to the oxidant gas outlet manifold 22b, is formed on a surface 18b of the second metal separator 18 facing the second membrane electrode assembly 16b. The second oxidant gas channel 38 includes a plurality of wave-shaped channel grooves (or linear channel grooves) 38a extending in the direction of arrow B. A plurality of inlet connection grooves 40a are formed near the oxidant gas inlet manifold 22a. A plurality of outlet connection grooves 40b are formed near the oxidant gas outlet manifold 22b.

As illustrated in FIG. 4, the second fuel gas channel (fluid channel) 42, through which the fuel gas inlet manifold 24a is connected to the fuel gas outlet manifold 24b, is formed on a surface 20a of the third metal separator 20 facing the second membrane electrode assembly 16b. The second fuel gas channel 42 includes a plurality of wave-shaped channel grooves (or linear channel grooves) 42a extending in the direction of arrow B.

Figure 3:
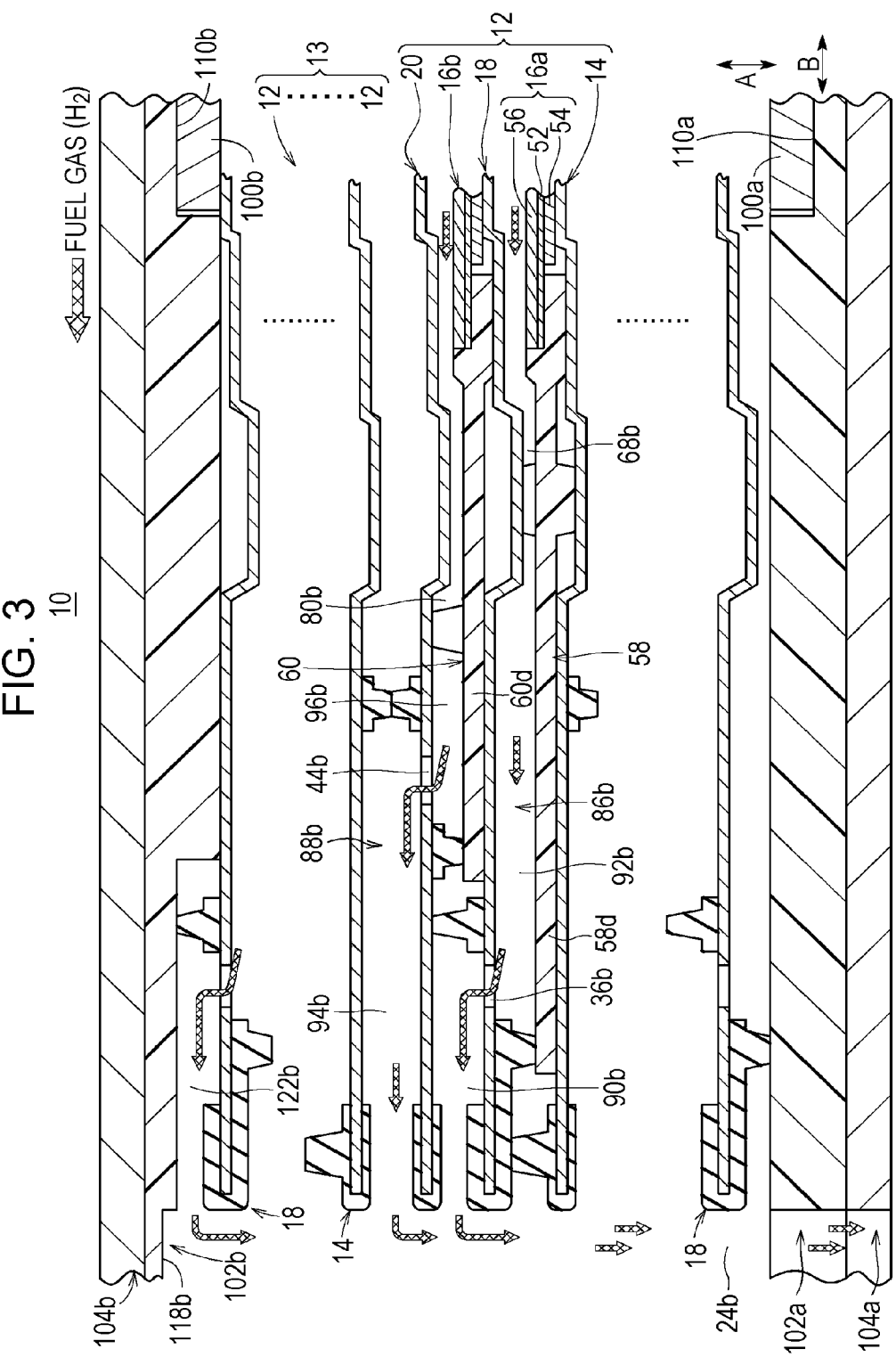
FIG. 3 is a sectional view of the fuel cell stack taken along line of FIG. 1.

A plurality of supply holes (fluid holes) 44a are formed near the fuel gas inlet manifold 24a. A plurality of discharge holes (fluid holes) 44b are formed near the fuel gas outlet manifold 24b. As illustrated in FIG. 2, the supply holes 44a are disposed inward from the supply holes 36a of the second metal separator 18 (nearer to the fuel gas channel). As illustrated in FIG. 3, the discharge holes (fluid holes) 44b are disposed inward from the discharge holes 36b of the second metal separator 18 (nearer to the fuel gas channel).

Figure 9:
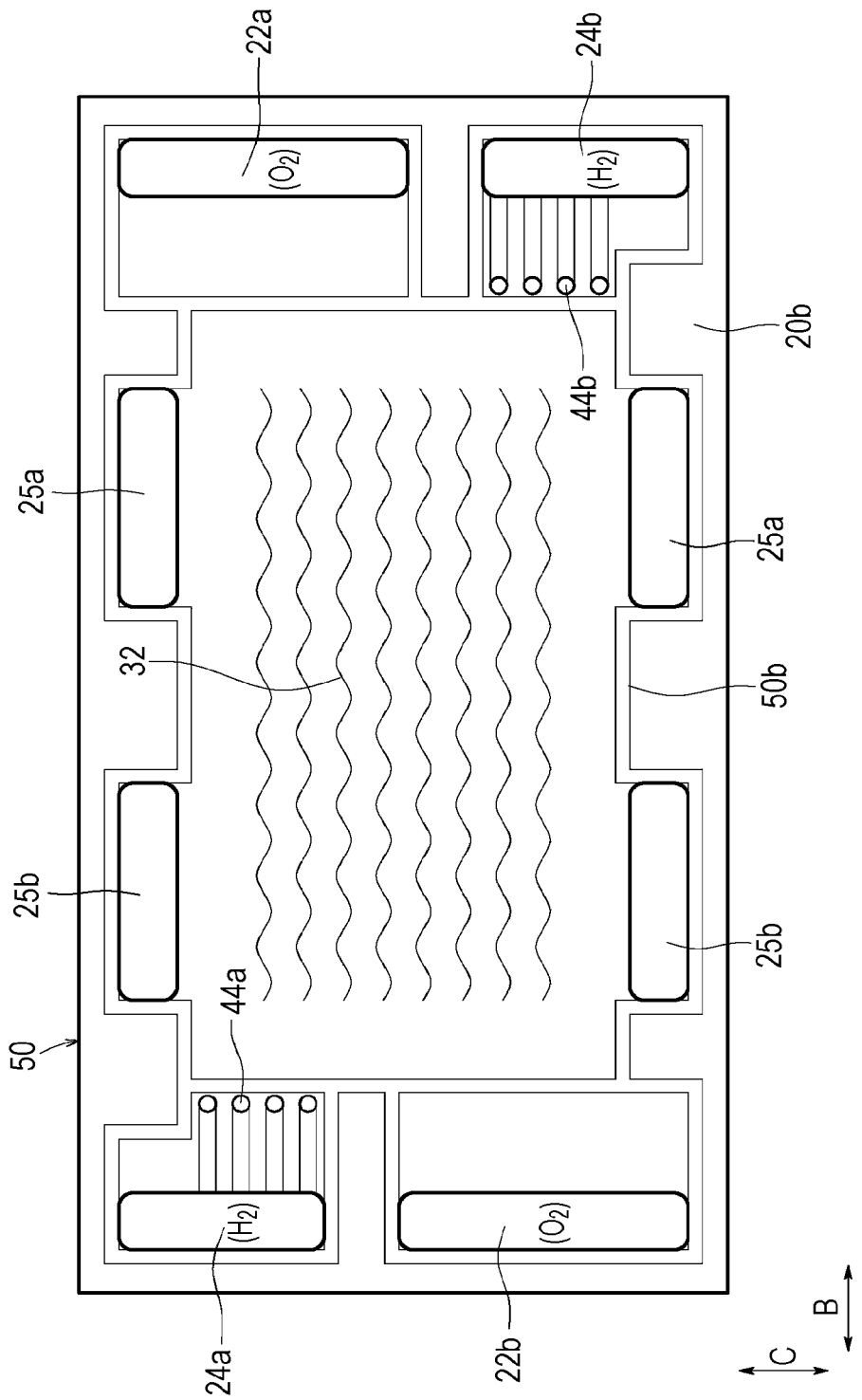
FIG. 9 is a plan view of a third metal separator of the power generation unit.

As illustrated in FIG. 9, a part of the coolant channel 32 is formed on a surface 20b of the third metal separator 20 on the back side of the second fuel gas channel 42. The coolant channel 32 is integrally formed between the surface 20b of the third metal separator 20 and the surface 14b of the first metal separator 14 that is disposed adjacent to the third metal separator 20.

As illustrated in FIG. 4, a first sealing member 46 is integrally formed on the surfaces 14a and 14b of the first metal separator 14 so as to surround the outer periphery of the first metal separator 14. A second sealing member 48 is integrally formed on the surfaces 18a and 18b of the second metal separator 18 so as to surround the outer periphery of the second metal separator 18. A third sealing member 50 is integrally formed on the surfaces 20a and 20b of the third metal separator 20 so as to surround the outer periphery of the third metal separator 20.

Each of the first sealing member 46, the second sealing member 48, and the third sealing member 50 is made from an elastic material such as a sealing material, a cushioning material, or a packing material. Examples of such materials include EPDM, NBR, fluorocarbon rubber, silicone rubber, fluorosilicone rubber, butyl rubber, natural rubber, styrene rubber, chloroprene-rubber, and acrylic rubber.

As illustrated in FIG. 6, the first sealing member 46 includes a first protruding sealing portion 46a on the surface 14a of the first metal separator 14. The first protruding sealing portion 46a connects the outer peripheries of the oxidant gas inlet manifold 22a, the oxidant gas outlet manifold 22b, and the first oxidant gas channel 26. As illustrated in FIG. 4, the first sealing member 46 includes a second protruding sealing portion 46b on the surface 14b of the first metal separator 14. The second protruding sealing portion 46b connects the outer peripheries of the coolant inlet manifolds 25a, the coolant outlet manifolds 25b, and the coolant channel 32.

As illustrated in FIG. 7, the second sealing member 48 includes a first protruding sealing portion 48a on the surface 18a of the second metal separator 18. The first protruding sealing portion 48a surrounds the supply holes 36a, the discharge holes 36b, and the first fuel gas channel 34 so that they are connected to each other.

As illustrated in FIG. 8, the second sealing member 48 includes a second protruding sealing portion 48b on the surface 18b of the second metal separator 18. The second protruding sealing portion 48b connects the outer peripheries of the oxidant gas inlet manifold 22a, the oxidant gas outlet manifold 22b, and the second oxidant gas channel 38.

As illustrated in FIG. 4, the third sealing member 50 includes a first protruding sealing portion 50a on the surface 20a of the third metal separator 20. The first protruding sealing portion 50a surrounds the supply holes 44a, the discharge holes 44b, and the second fuel gas channel 42 so that they are connected to each other.

As illustrated in FIG. 9, the third sealing member 50 includes a second protruding sealing portion 50b on the surface 20b of the third metal separator 20. The second protruding sealing portion 50b connects the outer peripheries of the coolant inlet manifolds 25a, the coolant outlet manifolds 25b, and the coolant channel 32.

As illustrated in FIGS. 2 and 3, the first membrane electrode assembly 16a and the second membrane electrode assembly 16b each include a solid polymer electrolyte membrane 52, and a cathode electrode 54 and an anode electrode 56 sandwiching the solid polymer electrolyte membrane 52 therebetween. The solid polymer electrolyte membrane 52 is, for example, a thin film that is made of a perfluorosulfonate polymer and that is impregnated with water. Each of the first and second membrane electrode assemblies 16a and 16b is a so-called stepped MEA, in which the cathode electrode 54 has planar dimensions smaller than those of the anode electrode 56 and the solid polymer electrolyte membrane 52. Alternatively, the cathode electrode 54, the anode electrode 56, and the solid polymer electrolyte membrane 52 may have the same planar dimensions. Further alternatively, the anode electrode 56 may have planar dimensions smaller than those of the cathode electrode 54 and the solid polymer electrolyte membrane 52.

The cathode electrode 54 and the anode electrode 56 each include a gas diffusion layer (not shown) and an electrode catalyst layer (not shown). The gas diffusion layer is made of carbon paper or the like. The electrode catalyst layer is formed on a surface of the gas diffusion layer by uniformly coating the surface with porous carbon particles whose surfaces support a platinum alloy. The electrode catalyst layers are disposed on both sides of the solid polymer electrolyte membrane 52.

The first membrane electrode assembly 16a includes a first resin frame member 58 that is disposed outward from an end of the cathode electrode 54 on the outer periphery of the solid polymer electrolyte membrane 52. The first resin frame member 58 is integrally formed by, for example, injection molding or the like. The second membrane electrode assembly 16b includes a second resin frame member 60 that is disposed outward from an end of the cathode electrode 54 on the outer periphery of the solid polymer electrolyte membrane 52. The second resin frame member 60 is integrally formed by, for example, injection molding or the like. The first resin frame member 58 and the second resin frame member 60 are each made of a resin material, such as a commodity plastic, an engineering plastic, or a super engineering plastic.

As illustrated in FIG. 4, on a surface of the first resin frame member 58 on the cathode electrode 54 side, an inlet buffer portion 62a is disposed between the oxidant gas inlet manifold 22a and the inlet of the first oxidant gas channel 26. An outlet buffer portion 62b is disposed between the oxidant gas outlet manifold 22b and the outlet of the first oxidant gas channel 26. The inlet buffer portion 62a and the outlet buffer portion 62b each include a plurality of protrusions and a plurality of linear channels. The same applies to other buffer portions described below.

Figure 10:
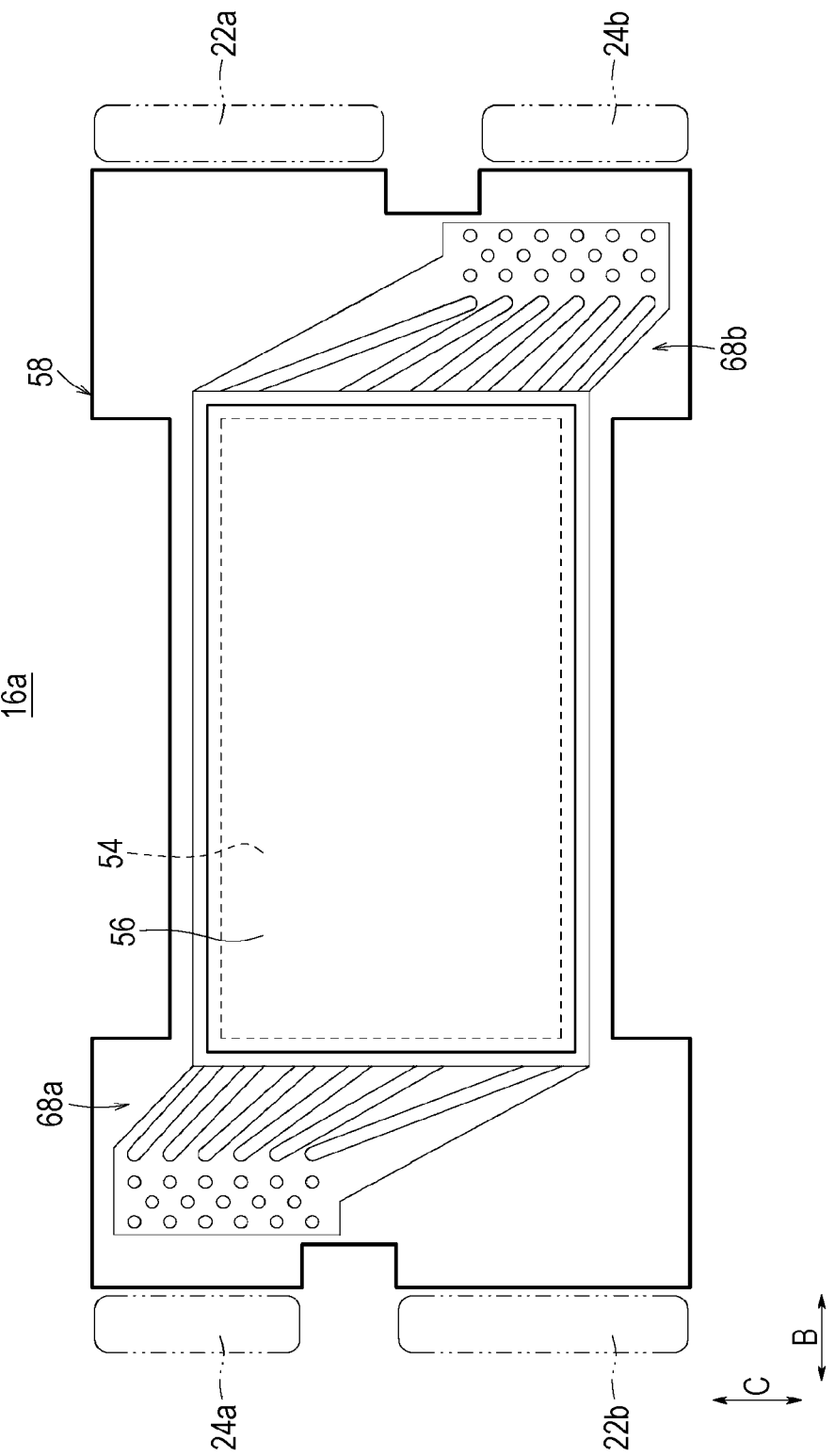
FIG. 10 is a plan view showing one surface of a first membrane electrode assembly of the power generation unit.

As illustrated in FIG. 10, on a surface of the first resin frame member 58 on the anode electrode 56 side, an inlet buffer portion 68a is disposed between the fuel gas inlet manifold 24a and the first fuel gas channel 34. An outlet buffer portion 68b is disposed between the fuel gas outlet manifold 24b and the first fuel gas channel 34.

As illustrated in FIG. 4, on a surface of the second resin frame member 60 on the cathode electrode 54 side, an inlet buffer portion 74a is disposed between the oxidant gas inlet manifold 22a and the second oxidant gas channel 38. An outlet buffer portion 74b is disposed between the oxidant gas outlet manifold 22b and the second oxidant gas channel 38.

Figure 11:
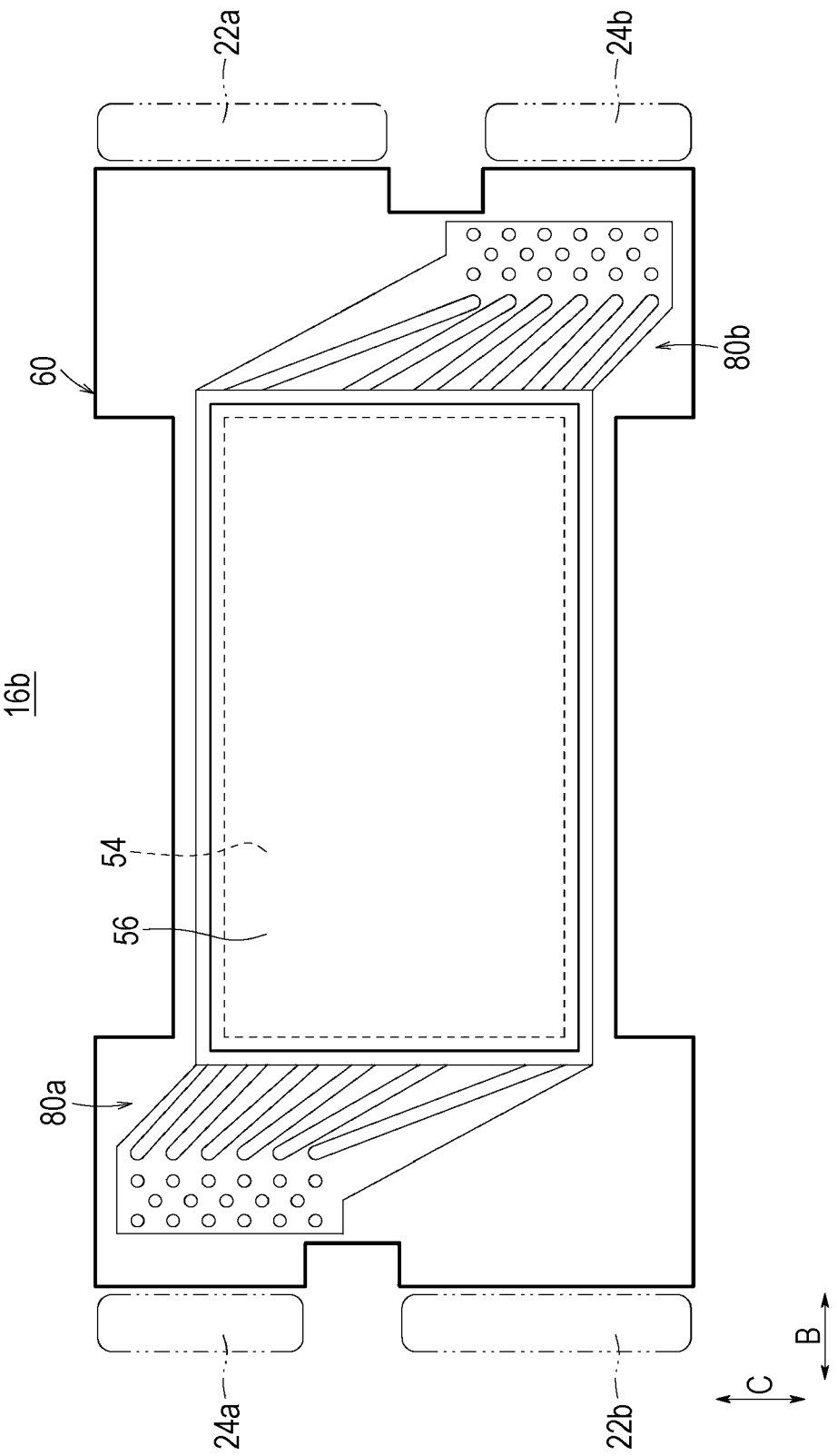
FIG. 11 is a plan view showing one surface of a second membrane electrode assembly of the power generation unit.

As illustrated in FIG. 11, on a surface of the second resin frame member 60 on the anode electrode 56 side, an inlet buffer portion 80a is disposed between the fuel gas inlet manifold 24a and the second fuel gas channel 42. An outlet buffer portion 80b is disposed between the fuel gas outlet manifold 24b and the second fuel gas channel 42.

As illustrated in FIG. 2, the fuel gas inlet manifold 24a is connected to the first fuel gas channel 34 through an inlet connection channel (connection passage) 86a and the inlet buffer portion 68a. The fuel gas inlet manifold 24a is connected to the second fuel gas channel 42 through the inlet connection channel (connection passage) 88a and the inlet buffer portion 80a.

The inlet connection channel 86a is disposed between the fuel gas inlet manifold 24a and the inlet buffer portion 68a. The inlet connection channel 86a includes a first channel 90a, the supply holes 36a, and a second channel 92a. The first channel 90a is formed between the second metal separator 18 and the third metal separator 20 that are disposed adjacent to each other. One end of the first channel 90a is connected to the fuel gas inlet manifold 24a, and the other end of the first channel 90a is connected to the supply holes 36a. The supply holes 36a are formed in the second metal separator 18. The second channel 92a is formed between the second metal separator 18 and a protruding portion 58c of the first resin frame member 58. One end of the second channel 92a is connected the supply holes 36a, and the other end of the second channel 92a is connected to the inlet buffer portion 68a.

Likewise, the inlet connection channel 88a includes a first channel 94a, the supply holes 44a, and a second channel 96a. The first channel 94a is formed between the third metal separator 20 and the first metal separator 14 that are disposed adjacent to each other. One end of the first channel 94a is connected the fuel gas inlet manifold 24a, and the other end of the first channel 94a is connected to the supply holes 44a. The supply holes 44a are formed in the third metal separator 20. The second channel 96a is formed between the third metal separator 20 and a protruding portion 60c of the second resin frame member 60. One end of the second channel 96a is connected the supply holes 44a, and the other end of the second channel 96a is connected to the inlet buffer portion 80a.

As illustrated in FIG. 3, the fuel gas outlet manifold 24b is connected to the outlet buffer portion 68b through an outlet connection channel (connection passage) 86b. The fuel gas outlet manifold 24b is connected to the outlet buffer portion 80b through the outlet connection channel (connection passage) 88b. The outlet connection channel 86b includes a first channel 90b, the discharge holes 36b, and a second channel 92b. The first channel 90b is formed between the second metal separator 18 and the third metal separator 20. The discharge holes 36b are formed in the second metal separator 18. The second channel 92b is formed between the second metal separator 18 and a protruding portion 58d of the first resin frame member 58.

The outlet connection channel 88b includes a first channel 94b, the discharge holes 44b, and a second channel 96b. The first channel 94b is formed between the third metal separator 20 and the first metal separator 14 that are disposed adjacent to each other. The discharge holes 44b are formed in the third metal separator 20. The second channel 96b is formed between the third metal separator 20 and a protruding portion 60d of the second resin frame member 60.

When two power generation units 12 are stacked each other, the coolant channel 32 is formed between the first metal separator 14 of one of the power generation units 12 and the third metal separator 20 of the other power generation unit 12.

As illustrated in FIG. 1, the second metal separators 18 are disposed at ends of the stacked body 13 in the stacking direction. Terminal portions 106a and 106b are respectively disposed at substantially the centers of the terminal plates 100a and 100b, which are disposed adjacent to the second metal separators 18 at the ends in the stacking direction. The terminal portions 106a and 106b extend outward in the stacking direction. The terminal portions 106a and 106b are respectively inserted into cylindrical insulators 108 so as to protrude to the outside of the end plates 104a and 104b. The insulators 102a and 102b are each made of an insulating material, such as a polycarbonate (PC) or a phenol resin.

The insulators 102a and 102b respectively include rectangular recessed portions 110a and 110b in middle portions thereof. Holes 112a and 112b are formed at substantially the centers of the recessed portions 110a and 110b. The terminal plates 100a and 100b are disposed in the recessed portions 110a and 110b. The terminal portions 106a and 106b of the terminal plates 100a and 100b are respectively inserted into the holes 112a and 112b with the cylindrical insulators 108 therebetween.

Holes 114a and 114b are respectively formed at substantially the centers of the end plates 104a and 104b so as to be coaxial with the holes 112a and 112b. In the end plate 104a, the oxidant gas inlet manifold 22a, the fuel gas inlet manifold 24a, the pair of coolant inlet manifolds 25a, the oxidant gas outlet manifold 22b, the fuel gas outlet manifold 24b, and the pair of coolant outlet manifolds 25b are formed.

Figure 12:
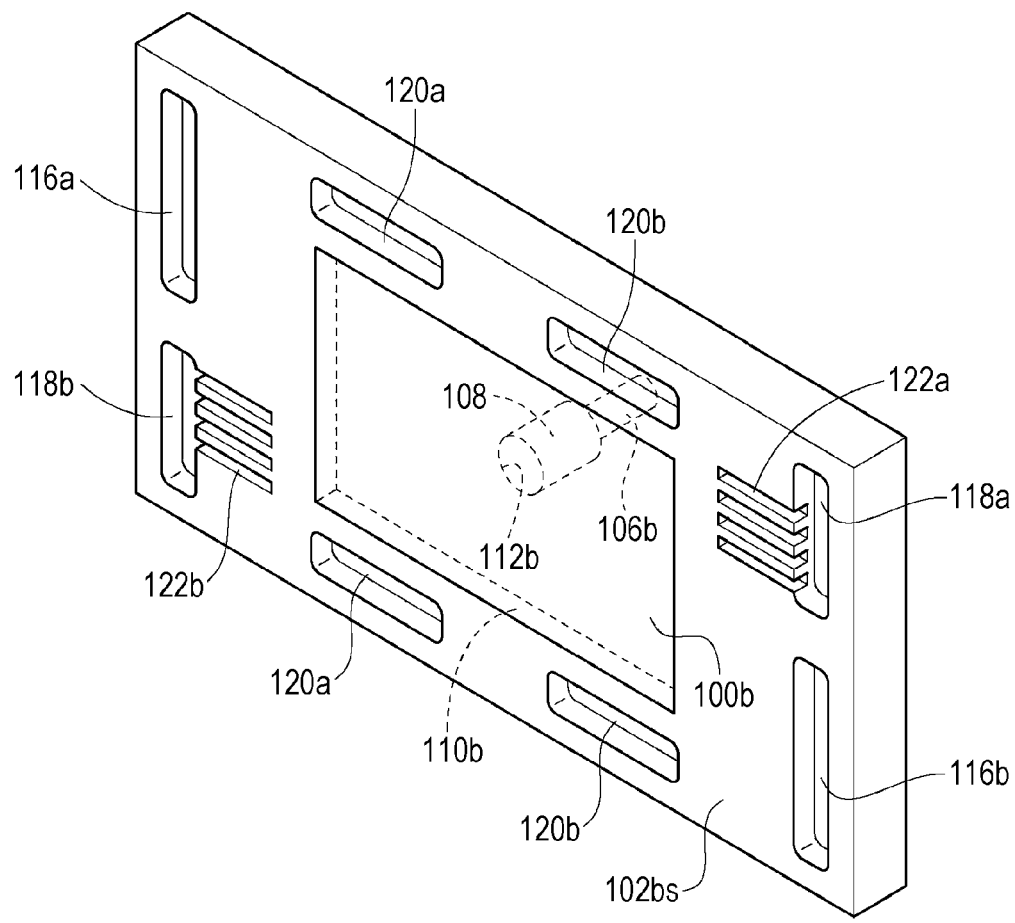
FIG. 12 is a perspective view of one of a pair of insulators of the fuel cell stack.

As illustrated in FIG. 12, in an outer peripheral part of a surface 102bs of the insulator 102b that is in contact with the second metal separator 18, recessed portions 116a and 116b are formed so as to correspond to the oxidant gas inlet manifold 22a and the oxidant gas outlet manifold 22b. Moreover, recessed portion 118a and 118b are formed in the surface 102bs so as to correspond to the fuel gas inlet manifold 24a and the fuel gas outlet manifold 24b, and recessed portion 120a and 120b are formed in the surface 102bs so as to correspond to the coolant inlet manifolds 25a and the coolant outlet manifolds 25b. The recessed portions 116a, 116b, 118a, 118b, 120a, and 120b may be omitted. In this case, the outer peripheral part of the surface 102bs may be flat.

An inlet channel 122a is formed in the surface 102bs. An end of the inlet channel 122a is connected to the recessed portion 118a, which corresponds to the fuel gas inlet manifold 24a. The inlet channel 122a extends toward the recessed portion 116a by a predetermined distance. The inlet channel 122a includes a plurality of channel grooves. As illustrated in FIG. 2, the inlet channel 122a corresponds to the first channel 90a of the inlet connection channel 86a.

As illustrated in FIG. 12, an outlet channel 122b is formed in the surface 102bs. An end of the outlet channel 122b is connected to the recessed portion 118b, which corresponds to the fuel gas outlet manifold 24b. The outlet channel 122b extends toward the recessed portion 116b by a predetermined distance. The outlet channel 122b includes a plurality of channel grooves. As illustrated in FIG. 3, the outlet channel 122b corresponds to the first channel 90b of the outlet connection channel 86b.

The operation of the fuel cell stack 10 will be described below.

First, as illustrated in FIG. 1, an oxidant gas, such as an oxygen-containing gas, is supplied to the oxidant gas inlet manifold 22a through the end plate 104a. A fuel gas, such as a hydrogen-containing gas, is supplied to the fuel gas inlet manifold 24a through the end plate 104a. A coolant, such as pure water, ethylene glycol, an oil, or the like, is supplied to the pair of coolant inlet manifolds 25a.

Figure 5:
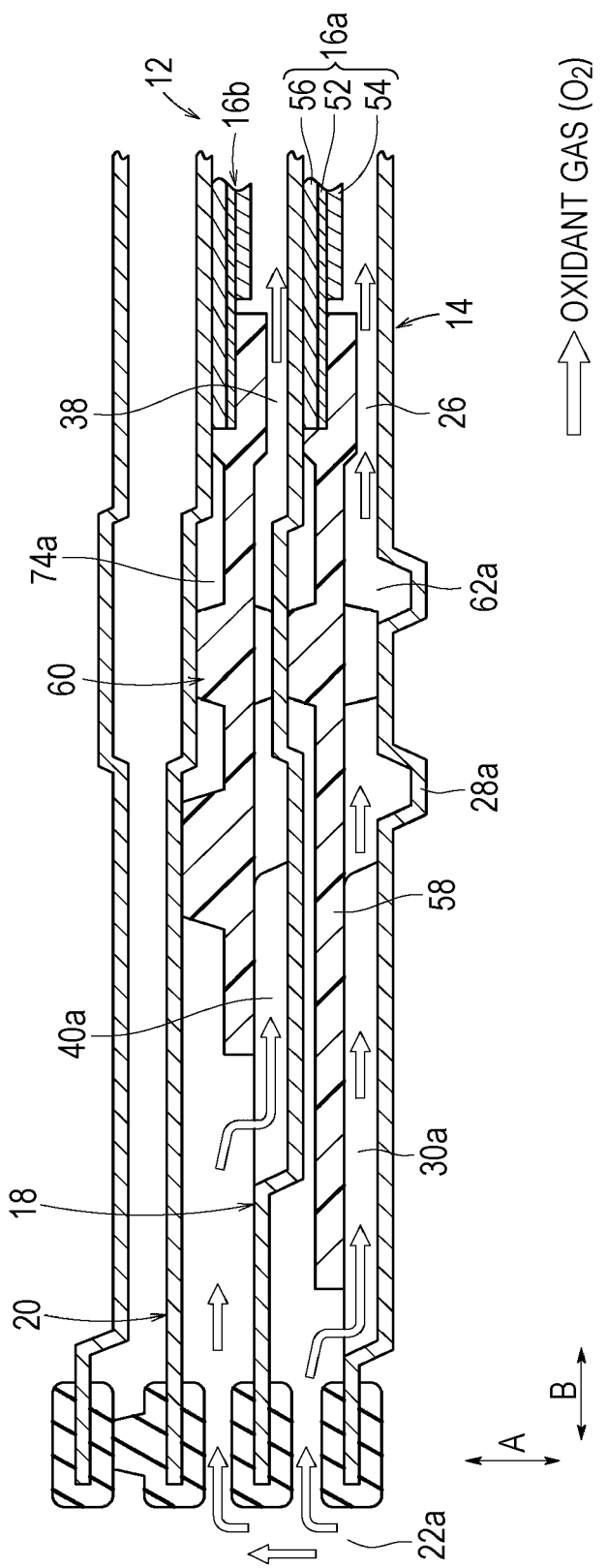
FIG. 5 is a sectional view of the power generation unit taken along line V-V of FIG. 4.

As illustrated in FIG. 5, a part of the oxidant gas flows from the oxidant gas inlet manifold 22a, through the inlet buffer portion 62a, and to the first oxidant gas channel 26 of the first metal separator 14. Another part of the oxidant gas flows through the inlet buffer portion 74a to the second oxidant gas channel 38 of the second metal separator 18.

As illustrated in FIGS. 4, 6, and 8, the oxidant gas moves along the first oxidant gas channel 26 in the direction of arrow B (horizontal direction), and is supplied to the cathode electrode 54 of the first membrane electrode assembly 16a. Moreover, the oxidant gas moves along the second oxidant gas channel 38 in the direction of arrow B, and is supplied to the cathode electrode 54 of the second membrane electrode assembly 16b.

As illustrated in FIG. 2, the fuel gas is introduced through the fuel gas inlet manifold 24a into the inlet connection channels 86a and 88a. In the inlet connection channel 86a, the fuel gas flows from the first channel 90a to the second channel 92a through the supply holes 36a, and is supplied to the inlet buffer portion 68a. The fuel gas flows through the inlet buffer portion 68a, and is supplied to the first fuel gas channel 34 of the second metal separator 18.

In the inlet connection channel 88a, the fuel gas flows from the first channel 94a to the second channel 96a through the supply holes 44a, and is supplied to the inlet buffer portion 80a. The fuel gas flows through the inlet buffer portion 80a, and is supplied to the second fuel gas channel 42 of the third metal separator 20.

As illustrated in FIGS. 4 and 7, the fuel gas flows along the first fuel gas channel 34 in the direction of arrow B, and is supplied to the anode electrode 56 of the first membrane electrode assembly 16a. Moreover, the fuel gas flows along the second fuel gas channel 42 in the direction of arrow B, and is supplied to the anode electrode 56 of the second membrane electrode assembly 16b.

Accordingly, in each of the first membrane electrode assembly 16a and second membrane electrode assembly 16b, the oxidant gas supplied to the cathode electrode 54 and the fuel gas supplied to the anode electrode 56 are consumed in electrochemical reactions in the electrode catalyst layers, and thereby electric power is generated.

Next, the oxidant gas, which has been supplied to the cathode electrodes 54 of the first membrane electrode assembly 16a and the second membrane electrode assembly 16b and consumed, is discharged through the outlet buffer portions 62b and 74b to the oxidant gas outlet manifold 22b.

As illustrated in FIG. 3, the fuel gas, which has been supplied to the anode electrodes 56 of the first membrane electrode assembly 16a and the second membrane electrode assembly 16b and consumed, is introduced through the outlet buffer portions 68b and 80b into the outlet connection channels 86b and 88b. In the outlet connection channel 86b, the fuel gas flows from the second channel 92b to the first channel 90b through the discharge holes 36b, and is discharged to the fuel gas outlet manifold 24b.

In the outlet connection channel 88b, the fuel gas flows from the second channel 96b to the first channel 94b through the discharge holes 44b, and is discharged to the fuel gas outlet manifold 24b.

As illustrated in FIG. 4, the coolant supplied to the pair of coolant inlet manifolds 25a is introduced to the coolant channel 32. The coolant, which has been supplied from the coolant inlet manifolds 25a to the coolant channel 32, temporarily flows inward in the direction of arrow C, then flows in the direction of arrow B, and cools the first membrane electrode assembly 16a and the second membrane electrode assembly 16b. Then, the coolant flows outward in the direction of arrow C, and is discharged to the pair of coolant outlet manifolds 25b.

In the first embodiment, as illustrated in FIGS. 2 and 12, the inlet channel 122a is formed in an outer peripheral part of the surface 102bs of the insulator 102b that is in contact with the second metal separator 18, and the inlet channel 122a forms a part of the inlet connection channel 86a (a part corresponding to the first channel 90a). Moreover, as illustrated in FIGS. 3 and 12, the outlet channel 122b is formed in an outer peripheral part of the surface 102bs, and the outlet channel 122b forms a part of the outlet connection channel 86b (a part corresponding to the first channel 90b).

Because a part of the inlet connection channel 86a and a part of the outlet connection channel 86b are formed in the insulator 102b, it is not necessary that the second metal separator 18 that is in contact with the insulator 102b have a special structure. Thus, a separator that is the same as the second metal separator 18 of the power generation unit 12 may be used as the second separator metal separator 18 that is in contact with the insulator 102b. Therefore, a special separator is not necessary, so that the first embodiment has an advantage in that the entirety of the fuel cell stack 10 can have a simple and economical structure.

Figure 13:
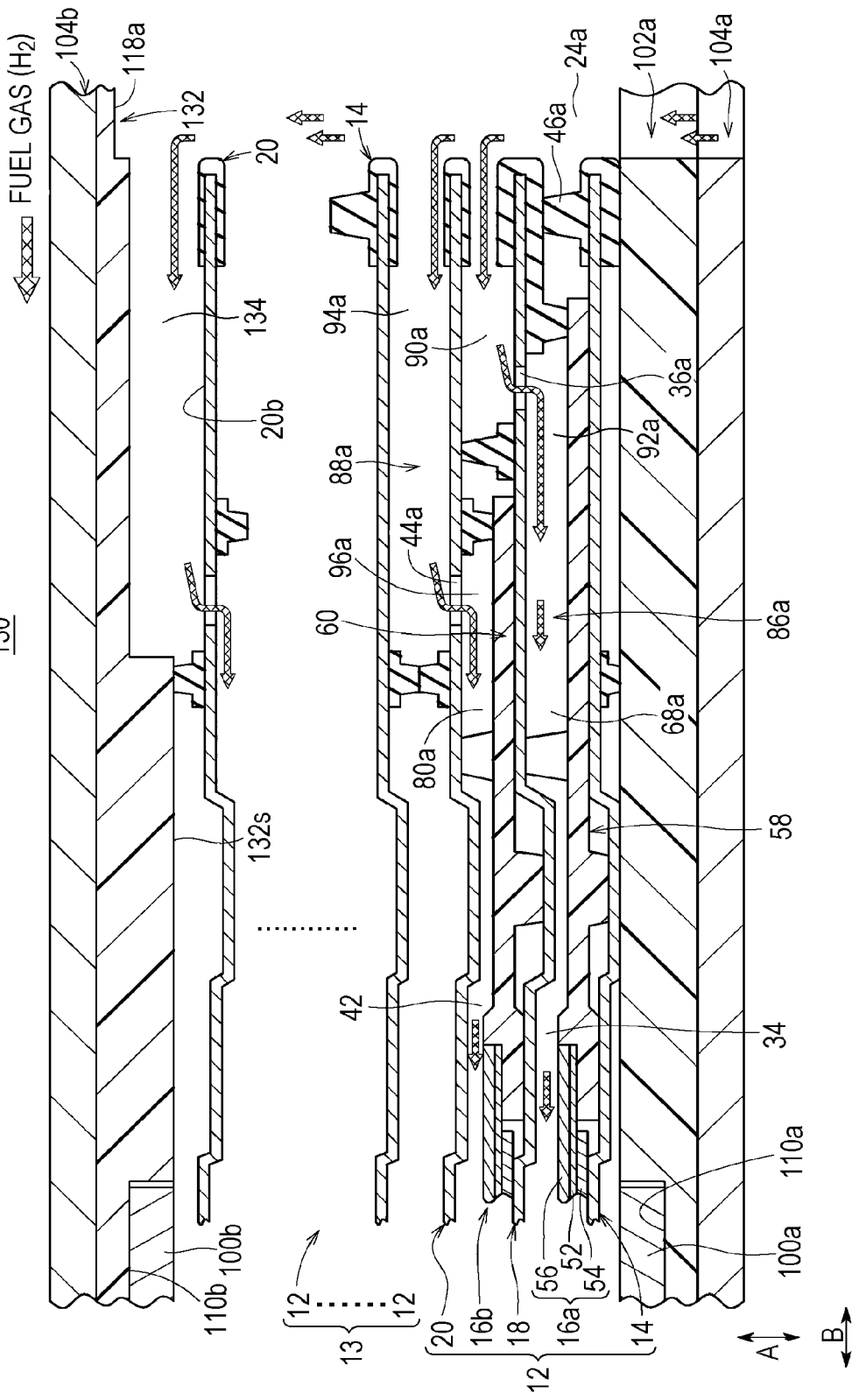
FIG. 13 is a partial sectional view of a fuel cell stack according to a second embodiment of the present disclosure.

FIG. 13 is a partial sectional view of a fuel cell stack 130 according to a second embodiment of the present disclosure. The components the same as those of the fuel cell stack 10 according to the first embodiment will be denoted by the same numerals, and detailed description of such components will be omitted. Likewise, detailed description of such components in a third embodiment (described below) will be omitted.

In the fuel cell stack 130, the first metal separator 14 is disposed at one end of the stacked body 13 in the stacking direction, and the third metal separator 20 is disposed at the other end of the stacked body 13 in the stacking direction. The terminal plate 100a, the insulator 102a, and the end plate 104a are stacked outward at one end of the stacked body 13. The terminal plate 100b, an insulator (insulation plate) 132, and the end plate 104b are stacked outward at the other end of the stacked body 13.

The insulator 132 is disposed in contact with the surface 20b of the third metal separator 20. An inlet channel 134, which corresponds to the first channel 94a of the inlet connection channel 88a, is formed on a surface 132s of the insulator 132 that is in contact with the third metal separator 20. The inlet channel 134 includes a plurality of channel grooves extending from the fuel gas inlet manifold 24a toward the supply holes 44a. Moreover, an outlet channel (not shown), which corresponds to the first channel 94b of the outlet connection channel 88b, is formed in the surface 132s.

In the second embodiment, the inlet channel 134 is formed in an outer peripheral part of the surface 132s of the insulator 132 that is in contact with the third metal separator 20, and the inlet channel 134 forms a part of the inlet connection channel 88a (a part corresponding to the first channel 94a).

Accordingly, it is not necessary that the third metal separator 20 that is in contact with the insulator 132 have a special structure, and the same separator can be used. Thus, the second embodiment has the same advantage as the first embodiment, in that the entirety of the fuel cell stack 130 can have a simple and economical structure.

Figure 14:
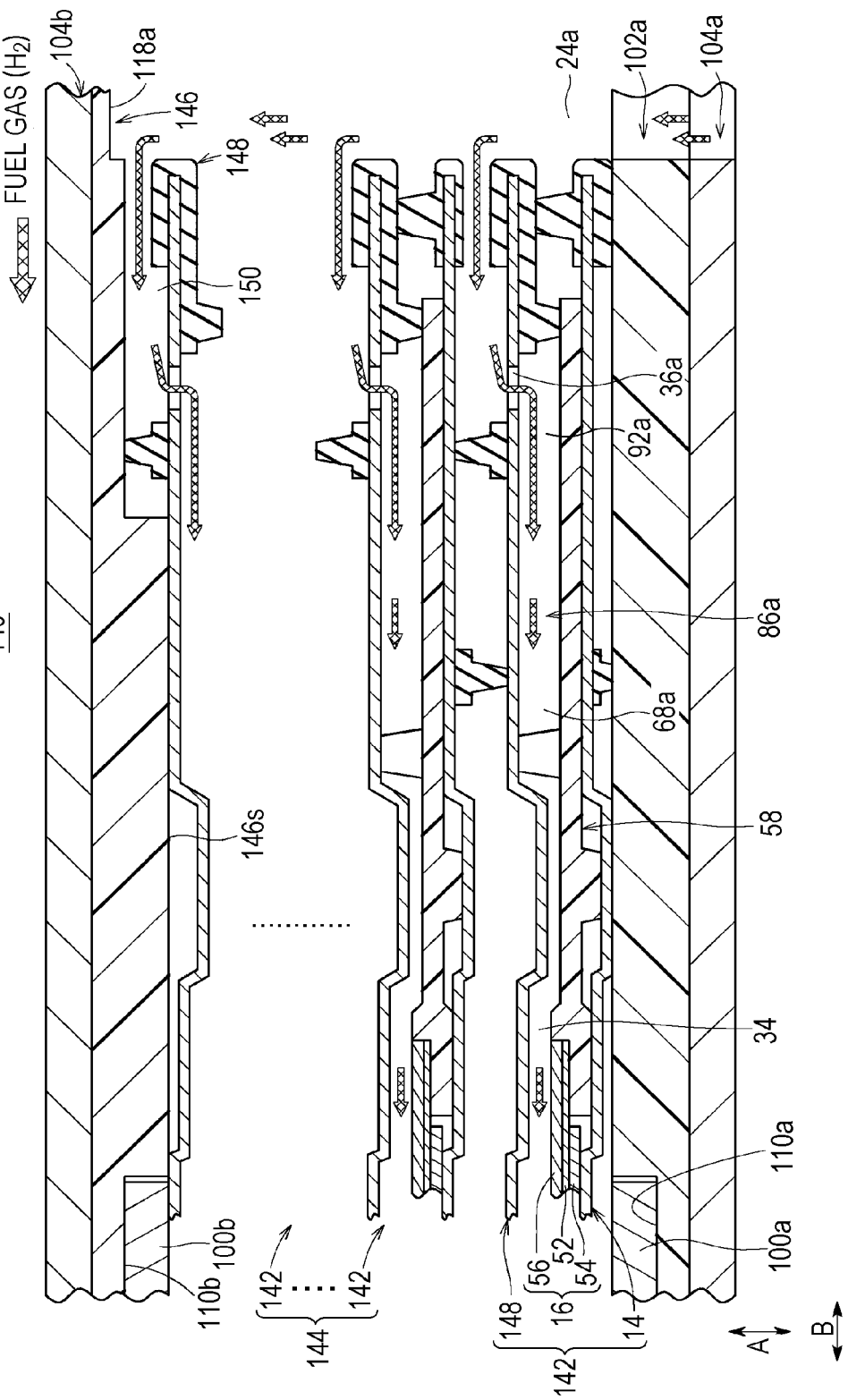
FIG. 14 is a partial sectional view of a fuel cell stack according to a third embodiment of the present disclosure.

As illustrated in FIG. 14, a fuel cell stack 140 according to the third embodiment of the present disclosure includes a stacked body 144 in which a plurality of power generation units 142 are stacked. The terminal plate 100a, the insulator 102a, and the end plate 104a are stacked outward at one end of the stacked body 144. The terminal plate 100b, an insulator (insulation plate) 146, and the end plate 104b are stacked outward at the other end of the stacked body 144

Figure 15:
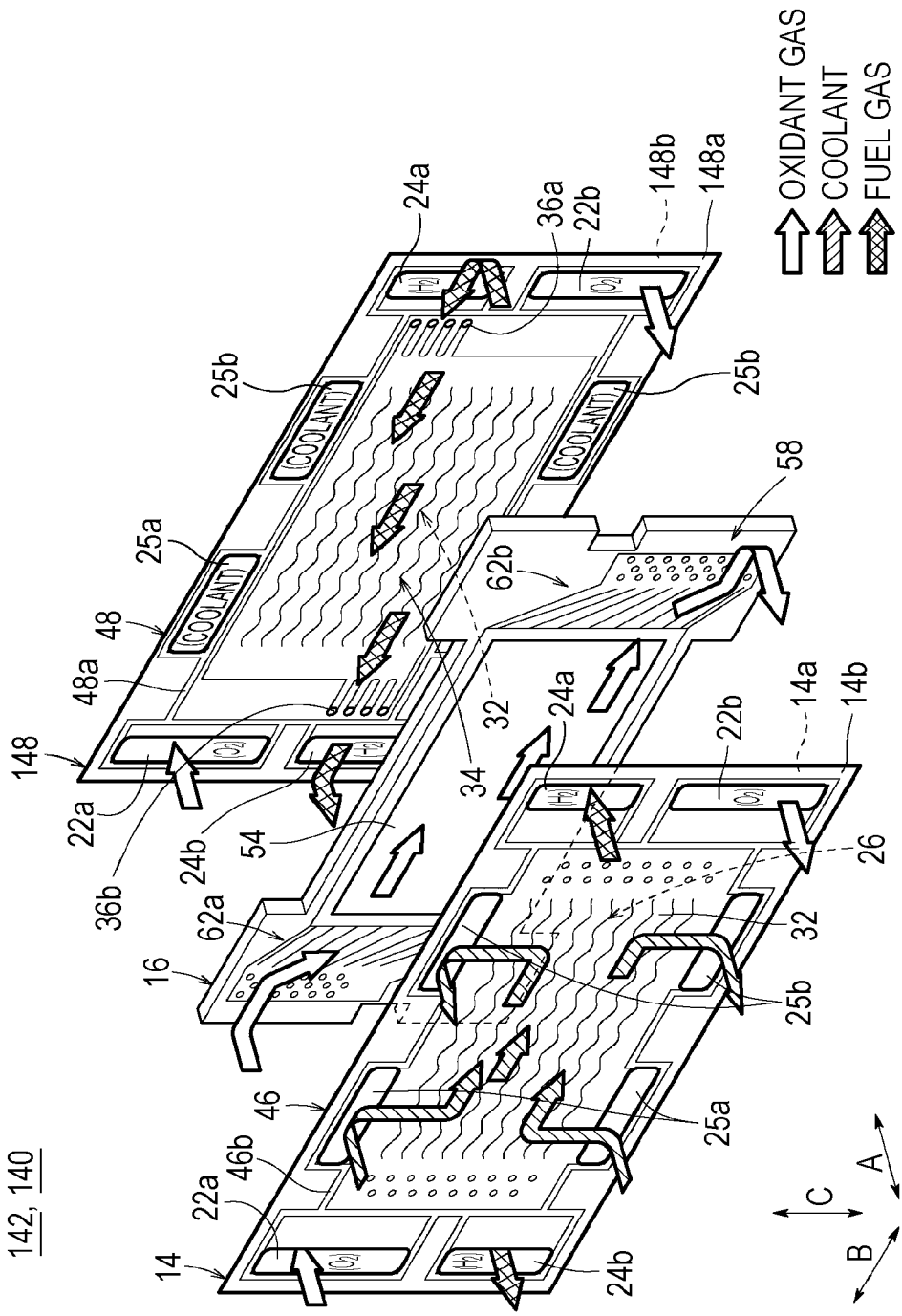
FIG. 15 is a partial exploded perspective view of a power generation unit of the fuel cell stack.

As illustrated in FIGS. 14 and 15, in the power generation unit 142, a membrane electrode assembly 16 is sandwiched between the first metal separator 14 and a second metal separator 148.

A fuel gas channel 34 is formed on a surface 148a of the second metal separator 148 facing the membrane electrode assembly 16, and a part of the coolant channel 32 is formed on a surface 148b of the second metal separator 148. The membrane electrode assembly 16 has a structure the same as that of the first membrane electrode assembly 16a or the second membrane electrode assembly 16b according to the first embodiment.

As illustrated in FIG. 14, an inlet channel 150, which corresponds to the first channel 90a of the inlet connection channel 86a, is formed in an outer peripheral part of a surface 146s of the insulator 146 that is in contact with the second metal separator 148. The inlet channel 150 includes a plurality of channel grooves extending from the fuel gas inlet manifold 24a toward the supply holes 36a. Moreover, an outlet channel (not shown), which corresponds to the first channel 90b of the outlet connection channel 86b, is formed in the surface 146s.

In the third embodiment, the inlet channel 150 is formed in an outer peripheral part of the surface 146s of the insulator 146 that is in contact with the second metal separator 148, and the inlet channel 150 forms a part of the inlet connection channel 86a (a part corresponding to the first channel 90a).

Accordingly, it is not necessary that the second metal separator 148 that is in contact with the insulator 146 have a special structure, and the same separator can be used. Thus, the third embodiment has the same advantage as the first and second embodiments, in that the entirety of the fuel cell stack 140 can have a simple and economical structure.

The structure described in the present disclosure can be used not only as the structure related to the fuel gas, but also as the structure related to the oxidant gas or the coolant. The structure of the insulator described above may be used as the structure related to the fuel gas inlet manifold. The resin frame member may extend to the outer periphery of the MEA, and the manifolds may be formed in the resin frame member.

According to an aspect of an embodiment of the present disclosure, a fuel cell stack includes a stacked body in which a membrane electrode assembly and a plurality of separators are stacked, the membrane electrode assembly including an electrolyte membrane and a pair of electrodes sandwiching the electrolyte membrane therebetween; a terminal plate, an insulator, and an end plate that are disposed at each of two ends of the stacked body in a stacking direction; a fluid manifold through which a fluid flows in the stacking direction, the fluid being a fuel gas, an oxidant gas, or a coolant; a fluid channel along which the fluid flows in an in-plane direction of the separators; a fluid hole that is formed in at least one of the separators so as to extend through the separator in the stacking direction; and a connection passage that connects the fluid manifold and the fluid hole to each other on one side of the separators and connects the fluid hole and the fluid channel to each other on the other side of the separator.

In the fuel cell stack, the terminal plate has dimensions smaller than those of the insulator and is disposed in a recessed portion of the insulator; and a channel is formed in an outer peripheral part of the insulator, the outer peripheral part being in contact with the at least one of the separators, the channel forming a part of the connection passage and connecting the fluid manifold and the fluid hole to each other.

With the aspect of an embodiment of the present disclosure, a channel that forms a part of the connection passage is formed in an outer peripheral part of the insulator that is in contact with at least one of the separators. Accordingly, it is not necessary that the separator that is in contact with the insulator have a special structure because a part of the connection passage is formed in the insulator. Thus, a separator the same as that of a fuel cell can be used as the separator that is in contact with the insulator. Therefore, it is not necessary that the fuel cell stack include a special separator and therefore the fuel cell stack can have a simple and economical structure.

Obviously, numerous modifications and variations of the present invention are possible in light of the above teachings. It is therefore to be understood that within the scope of the appended claims, the invention may be practiced otherwise than as specifically described herein.

What is claimed is:

1. A fuel cell stack comprising:
   a stacked body comprising a plurality of separators and a membrane electrode assembly which are stacked in a stacking direction, the membrane electrode assembly including an electrolyte membrane and a pair of electrodes sandwiching the electrolyte membrane therebetween, the stacked body having a first end and a second end opposite to the first end in the stacking direction;
   a first terminal plate, a first insulator, and a first end plate disposed at the first end of the stacked body, a second terminal plate, a second insulator, and a second end plate being disposed at the second end of the stacked body, each of the first and second terminal plates being provided in a first recessed portion formed in each of the first and second insulators, each of the first and second insulators having a channel formed in an outer peripheral part of each of the first and second insulators;
   a fluid manifold through which a fluid is to flow in the stacking direction, the fluid including a fuel gas, an oxidant gas, a coolant, or a combination thereof;
   a fluid channel through which the fluid is to flow along a surface of the plurality of separators;
   a fluid hole provided in at least one separator among the plurality of separators to extend through the at least one separator in the stacking direction, the outer peripheral part of each of the first and second insulators being in contact with the at least one separator;
   a first connection passage connecting the fluid manifold and the fluid hole on a first side of the at least one separator, the first side of the at least one separator being in contact with the first insulator; and
   a second connection passage connecting the fluid hole and the fluid channel on a second side opposite to the first side of the at least one separator,
   the channel of the first insulator forming a part of the first connection passage and connecting the fluid manifold and the fluid hole.

2. The fuel cell stack according to claim 1,
wherein, a second recessed portion is formed in the outer peripheral part of the first insulator so as to correspond to the fluid manifold, an end of the channel is connected to the second recessed portion, the channel forms the first connection passage and connects the fluid manifold and the fluid hole.

3. The fuel cell stack according to claim 1,
wherein the channel in the outer peripheral part of the first insulator forms a plurality of channel grooves.

4. The fuel cell stack according to claim 1,
wherein the plurality of separators includes at least three separators, the at least three separators including:
   the at least one separators that are in contact with the outer peripheral parts of the respective first and second insulators;
   and a separator disposed within a power generation unit of the fuel cell stack.

5. The fuel cell stack according to claim 1,
wherein the first insulator has a second recessed portion formed by an area of reduced thickness of the first insulator in the stacking direction, the second recessed portion forming a bottom surface of the one of the first insulator.

6. The fuel cell stack according to claim 5,
wherein the second recessed portion is aligned with the fluid manifold and configured to prevent the flow of fluid in the stacking direction.

7. The fuel cell stack according to claim 5,
wherein an end of the fluid manifold is disposed at the second recessed portion of the first insulator.

8. A fuel cell stack comprising:
a stacked body comprising a plurality of separators and a membrane electrode assembly which are stacked in a stacking direction, the membrane electrode assembly including an electrolyte membrane and a pair of electrodes sandwiching the electrolyte membrane therebetween, the stacked body having a first end and a second end opposite to the first end in the stacking direction;
a terminal plate, an insulator, and an end plate disposed at the first end of the stacked body, the terminal plate being provided in a recessed portion formed in the insulator, the insulator having a channel formed in an outer peripheral part the insulator;
a fluid manifold through which a fluid is to flow in the stacking direction, the fluid including a fuel gas, an oxidant gas, a coolant, or a combination thereof;
a fluid channel through which the fluid is to flow along a surface of the plurality of separators;
a fluid hole provided in at least one separator among the plurality of separators to extend through the at least one separator in the stacking direction, the outer peripheral part of the insulator being in contact with the at least one separator;
a first connection passage connecting the fluid manifold and the fluid hole on a first side of the at least one separator, the first side of the at least one separator being in contact with the first insulator; and
a second connection passage connecting the fluid hole and the fluid channel on a second side opposite to the first side of the at least one separator,
the channel of the insulator forming a part of the first connection passage and connecting the fluid manifold and the fluid hole.

9. The fuel cell stack according to claim 8,
wherein the insulator has a second recessed portion formed by an area of reduced thickness of the insulator in the stacking direction, the second recessed portion forming a bottom surface of the insulator.

10. The fuel cell stack according to claim 9,
wherein an end of the channel is connected to the second recessed portion, and the channel forms the first connection passage and connects the fluid manifold and the fluid hole.

11. The fuel cell stack according to claim 9,
wherein the second recessed portion is aligned with the fluid manifold and configured to prevent the flow of fluid in the stacking direction.

12. The fuel cell stack according to claim 9,
wherein an end of the fluid manifold is disposed at the second recessed portion of the insulator.

13. The fuel cell stack according to claim 9,
wherein the channel forms a second area of reduced thickness of the insulator in the stacking direction, the second area of reduced thickness of the channel having a greater thickness in the stacking direction than the area of reduced thickness of the second recessed portion.

14. The fuel cell stack according to claim 9,
wherein the channel in the outer peripheral part of the insulator forms a plurality of channel grooves.

15. The fuel cell stack according to claim 14,
wherein the plurality of channel grooves extend directly from the second recessed portion.

* * * * *